J. H. OLLIER.
ANIMAL TRAP.
APPLICATION FILED JUNE 15, 1915.
1,293,894.
Patented Feb. 11, 1919.
3 SHEETS—SHEET 3.
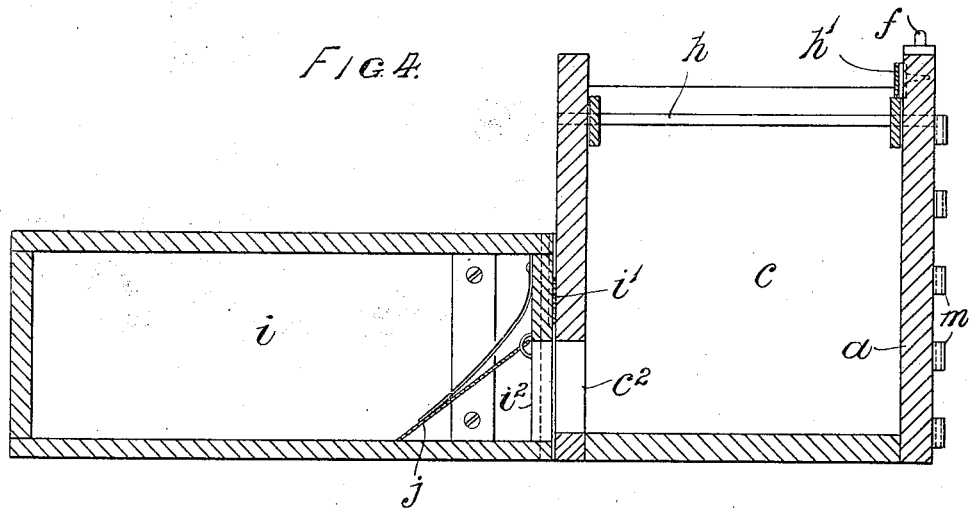
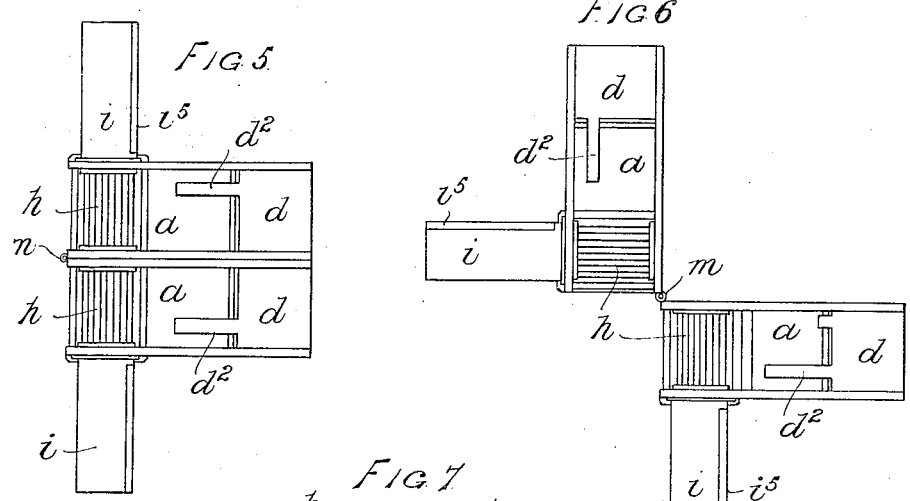
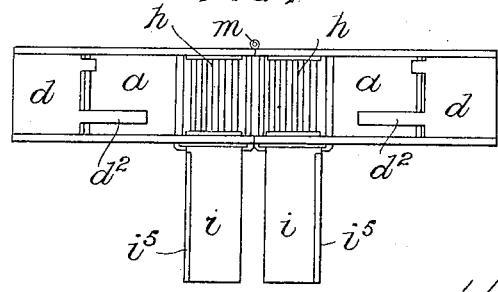
INVENTOR:
Joseph Henry Ollier
By Wallace White
ATTY.

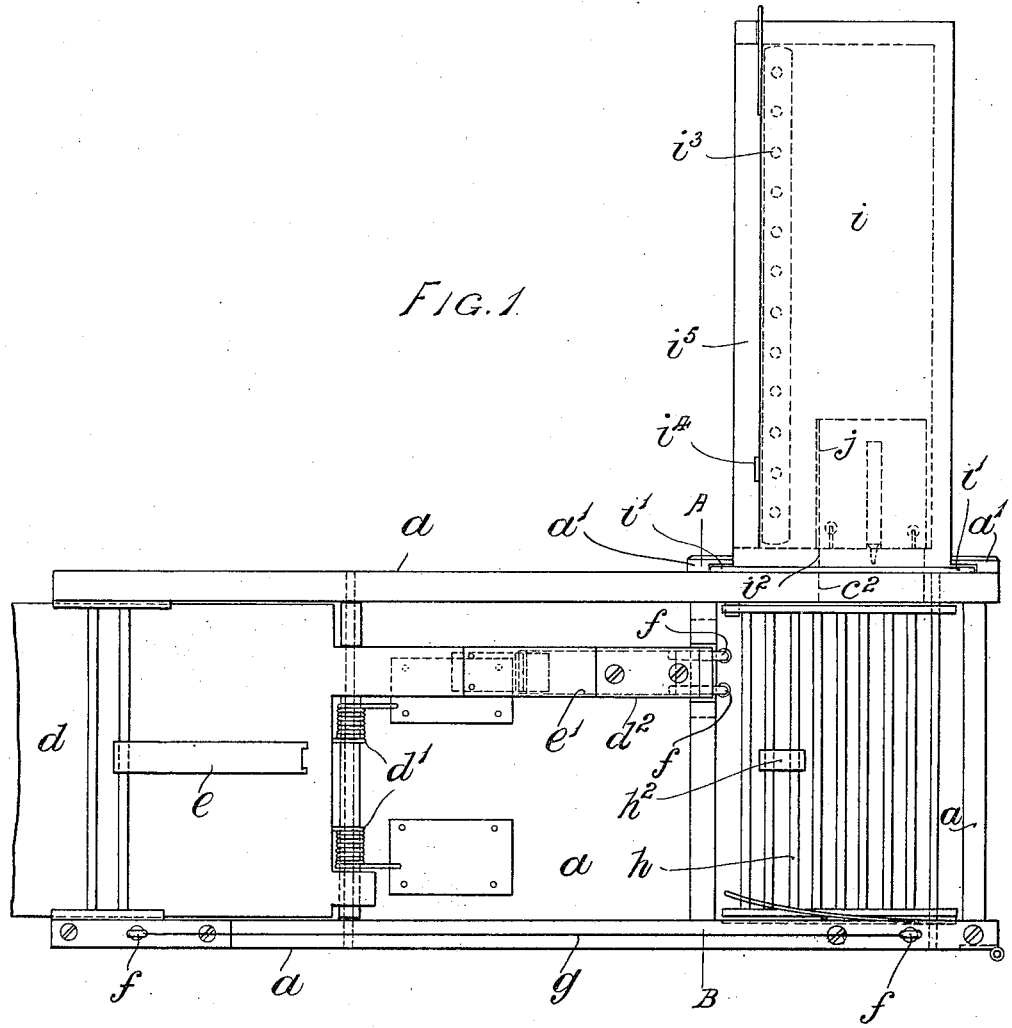

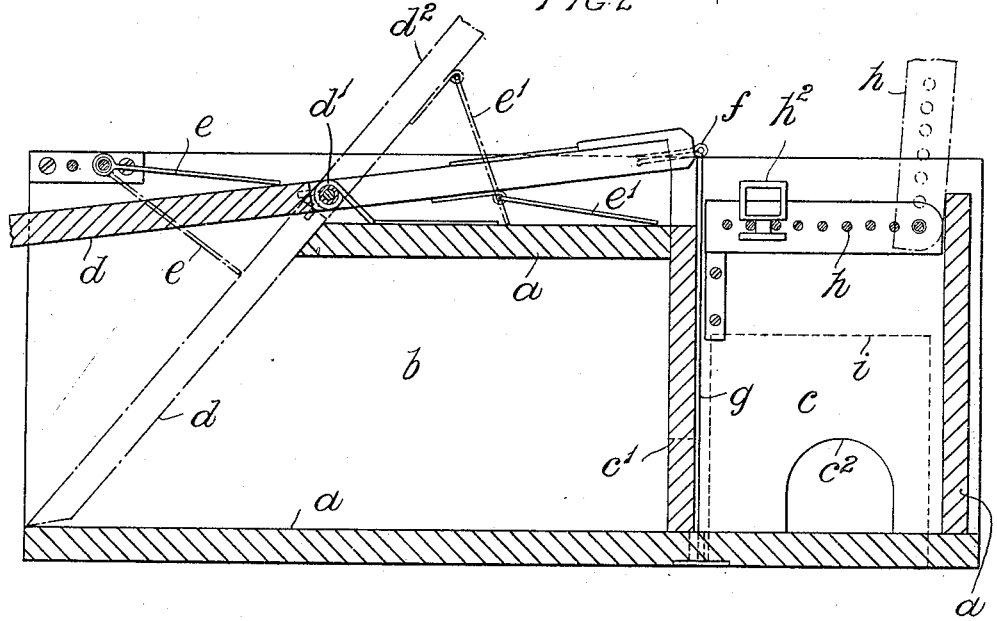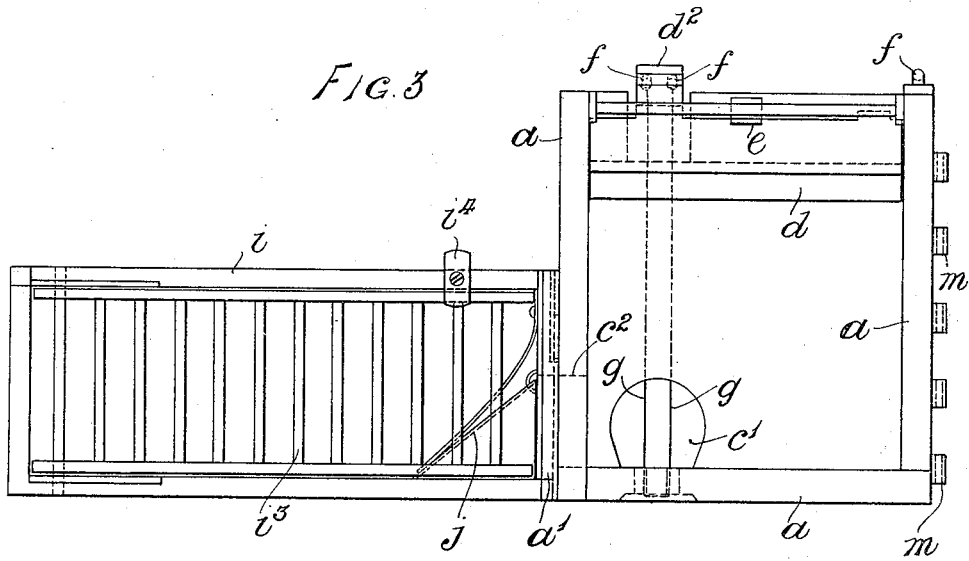

UNITED STATES PATENT OFFICE.

JOSEPH HENRY OLLIER, OF MANCHESTER, ENGLAND.

ANIMAL-TRAP.

1,293,894.

Specification of Letters Patent. Patented Feb. 11, 1919.

Application filed June 15, 1915. Serial No. 34,138.

*To all whom it may concern:*

Be it known that I, JOSEPH HENRY OLLIER, a subject of the King of Great Britain, residing at 66 Clifford street, Chorlton Road, Manchester, in the county of Lancaster, England, have invented new and useful Improvements in Animal-Traps, of which the following is a specification.

My invention relates to improvements in traps for catching rats, mice and the like and particularly to the type of trap in which the entrance to the cell or catching chamber is guarded by a spring trap door.

My improvements consist essentially of novel combinations and arrangements of parts characterized by the fact that when the trap is set the rodent can only obtain entrance to the cell or catching chamber, in which the bait is placed, by gnawing through a thread or threads which normally hold the spring trap door open when the trap is set and are stretched across and guard the entrance hole.

I am aware that it has been proposed to construct a trap consisting of a single chamber in which the bait is arranged between a sheet of glass forming one end and a sliding door acting by gravity to close the other end of the chamber, and held in the open position by a lever and string stretched across the chamber in front of the bait, the dimensions being such that the mouse must bite through the string in order to reach the bait; and I wish it to be understood that I lay no claim to any such arrangement.

In carrying my invention into effect I form a box or trap casing of metal, wood or other suitable material which is divided into two compartments. The first is closed at one end by a spring trap door through which the rodent enters when the trap is set. The second compartment or cell contains the bait, such as corn, cheese, etc., and the entrance to the cell is through a hole of suitable size which is guarded by a thread or threads, preferably two threads, of cotton or other suitable material which are held or tied at the bottom of the box and pass upward across the entrance hole to the arm or lever which holds the spring trap door open when the trap is set.

The rat or other rodent entering the trap is attracted by the bait in the cell, which it sees through the entrance hole, but is prevented from entering until it has gnawed through a thread. This at once releases the spring trap door which is closed and cannot be opened by any effort on the part of the rat through a pivoted catch or catches, preferably two such catches which fall into position when the trap door is closed and assist the light spring or springs in holding it closed against any effort on the part of the rat or other rodent.

The top of the cell is preferably closed by a hinged grating held down by a spring catch and provided with a sliding thumb piece or equivalent for convenience in opening the same and setting the trap or for other purposes.

In the accompanying three sheets of drawings—

Figure 1 is a plan of one complete section of my improved trap shown set ready for catching a rat or other rodent.

Fig. 2 is a longitudinal sectional elevation of the same.

Fig. 3 is an end elevation showing the entrance hole into the cell and the catcher with the outer door removed to show the grating forming the inner door.

Fig. 4 is a longitudinal sectional elevation of Fig. 3.

Figs. 5, 6 and 7 are plan views showing two complete trap sections pivoted or hinged together and placed in three different positions, viz., parallel, at right angles to one another, and tandem, respectively.

Referring first to Figs. 1 to 4—$a$ designates the trap casing of any suitable material or combination of materials; $b$ the entrance chamber or first compartment; $c$ the cell or catching chamber forming the second compartment; $c'$ the hole forming the entrance to the cell; $d$ the usual spring trap door; $d'$ its springs; $d^2$ its setting lever; $e\ e'$ the two pivoted retaining catches which I prefer to employ in order to prevent the captured rodent from raising the closed door $d$ and thus finding a way of escape; $f$ split pins; $g$ cotton or other thread; $h$ the hinged grating which is the preferred form of lid or cover for the top of the cell; $h'$ a spring retaining catch which holds the lid $h$ in position when closed, and $h^2$ a sliding thumb piece fitted on the bars of the lid $h$ for convenience in opening the lid when the spring catch $h'$ is pressed back.

The above constitutes in itself a complete trap but for convenience in withdrawing a rat or other captured rodent I employ what for convenience of description I term "a catcher" consisting of a box or casing $i$ provided with slides or guides $i'$ to fit in slideways $a'$ or equivalent connections on one side of the cell $c$ in the main trap. I form a hole $c^2$ in the side of the cell $c$ and a hole $i^2$ in the end of the catcher $i$ so that the two holes $c^2$ $i^2$ coincide when the catcher is attached to the main trap as shown in the drawings. The hole $i^2$ in the catcher is guarded by a spring trap door $j$, preferably in the form of a hollow wedge, see Figs. 3 and 4, so that the rat can force its way into the catcher but the spring door $j$ closing automatically behind its entrance prevents its return. One side $i^5$ of the catcher is made to open and when open discloses, as shown in Fig. 3, an inner hinged door $i^3$ composed of metal bars held closed by a retaining catch $i^4$. The catcher $i$ with the rat can thus be readily detached from the main trap $a$ and the captured rodent shown and given to a dog or otherwise disposed of.

For convenience in setting the trap I prefer to employ the two split eye pins $f$ which can be inserted in holes formed in the trap, as shown in Fig. 1, and placed at the distance apart which represents the correct length of thread required. One end of the thread $g$ is then passed through the first eye pin $f$ and carried to the second, and when each end is attached to the eye pins $f$ and cut off from the main length the piece of thread stretched between the two eye pins $f$ represents the length of thread required in setting the trap.

The setting of the trap door may be effected in any convenient manner but conveniently by withdrawing the split eye pins $f$ from the holes in the top of one side of the casing $a$ and threading them through two holes in the bottom of the cell $c$, then drawing them upward across the entrance hole $c'$ and then inserting them into the end of the arm or lever $d^2$ of the spring trap door $d$ so that the latter is held open and its springs $d'$ hold the doubled thread stretched across the entrance hole.

If found advantageous or desirable the trap may be divided into two or more parts hinged, pivoted, or otherwise suitably connected together so as to give ready access to any part desired and to facilitate setting and cleaning. For example it is convenient to divide the casing at or about the plane of the line A—B, Fig. 1, and to hinge the cell $c$ to the first compartment $b$ of the main casing $a$.

The foregoing constitutes a complete section which may be duplicated by pivoting or hinging a second section thereto at $m$, the hinge $m$ enabling the second section to be used parallel with the first, as shown in Fig. 5, or at any desired angle to the first, as at right angles, see Fig. 6, or in line therewith, see Fig. 7, or the two sections may be disconnected and each used as a separate trap.

What I claim and desire to secure by Letters Patent in the United States is—

In an animal trap the combination comprising a casing formed of solid walls open at one end and having an opening in its top wall, a grating disposed across the opening, a spring-pressed pivoted closure for the open end of the casing, a solid partition disposed transversely of the casing and provided with an opening, and severable members secured at one end and connected to the closure, disposed across the opening in the solid partition and adapted to hold the closure in open position.

In testimony whereof I have signed my name to this specification in the presence of two subscribing witnesses.

JOSEPH HENRY OLLIER.

Witnesses:
S. W. GILLETT,
HERBERT ROWLAND ABBEY.

Copies of this patent may be obtained for five cents each, by addressing the "Commissioner of Patents, Washington, D. C."